March 14, 1944.　　A. L. FORBES　　2,343,969
PERPETUAL CALENDAR
Filed Feb. 7, 1942　　6 Sheets-Sheet 1

INVENTOR
ARTHUR L. FORBES
BY
ATTORNEY

March 14, 1944.    A. L. FORBES    2,343,969
PERPETUAL CALENDAR
Filed Feb. 7, 1942    6 Sheets-Sheet 2

Fig. 4

INVENTOR
ARTHUR L. FORBES.
BY
ATTORNEY

March 14, 1944.   A. L. FORBES   2,343,969
PERPETUAL CALENDAR
Filed Feb. 7, 1942   6 Sheets-Sheet 3

INVENTOR
ARTHUR L. FORBES
BY
ATTORNEY

March 14, 1944.  A. L. FORBES  2,343,969
PERPETUAL CALENDAR
Filed Feb. 7, 1942  6 Sheets-Sheet 4

INVENTOR
ARTHUR L. FORBES.
BY
ATTORNEY

March 14, 1944.　　A. L. FORBES　　2,343,969
PERPETUAL CALENDAR
Filed Feb. 7, 1942　　6 Sheets-Sheet 5

INVENTOR
ARTHUR L. FORBES
BY
ATTORNEY

March 14, 1944. A. L. FORBES 2,343,969
PERPETUAL CALENDAR
Filed Feb. 7, 1942 6 Sheets-Sheet 6

INVENTOR
ARTHUR L. FORBES.
BY
ATTORNEY

Patented Mar. 14, 1944

2,343,969

UNITED STATES PATENT OFFICE 2,343,969

PERPETUAL CALENDAR

Arthur L. Forbes, St. Albans, N. Y.

Application February 7, 1942, Serial No. 429,869

14 Claims. (Cl. 40—111)

The invention relates to clock driven mechanical calendars embodiments of which continuously display calendar information, usually four items of such information, namely, the day of the week, the month, the day of the month, and the year. In such mechanisms all of the displays except that of the year are repetitive and the mechanism is driven continuously at the proper predetermined rate so as to constitute a perpetual calendar.

Embodiments of the invention will simultaneously shift the displays of the days of the week and month every twenty-four hours, and will selectively shift the display of each month after an accumulation of the proper number of days for the month. The yearly display is actuated in proper sequence intermittently and means properly related to the yearly actuation operate to modify the shifting of the monthly display in leap years so as to take care of the extra day in February of those years.

An object of the invention is to make the mechanism simple and compact and at the same time dependable in its operation. To this end in accordance with the invention the several calendar display units are each suitably in the form of rotative connected spaced discs forming a spool-like construction from which are loosely hung calendar cards spanning the discs. Each card has on a face half of a complete display and two cards, one upright and one depending, cooperate to make a complete display. The calendar units are actuated intermittently at the proper times and some suitable means such as an overhanging finger catches the top cards as they are progressively brought around to display position and holds them temporarily upright until they are released by the next actuation and drop down in reverse position to form the lower half of the next display.

It is desirable, in order to assure a change of display instantly when the proper time arrives, that the intermittent actuation be sudden and positive. For this purpose the invention contemplates a gear wheel that is driven continuously by the clock but which is so constructed and controlled that when the time arrives for it to effect an actuation of the intermittent drive, it is caused to jump suddenly through a substantial angle. A suitable gear wheel for such purpose is a mutilated gear which is coupled to some energy storing device such as a weight that comes into play when the drive pinion rides off from the toothed onto the smooth part of the wheel. The wheel is thus rotated on around until the pinion engages again.

This sudden impulse to effect positive shifting must obviously occur at the end of each twenty-four hours in the case of the day calendars, and at the end of each month in the case of the monthly calendar. But the months are of different durations and to provide for this the mutilated gear that operates to actuate the monthly calendar is so constructed that its drive pinion may be caused to escape from the teeth and permit the energy storing means to operate selectively at the end of the twenty-eighth, twenty-ninth, thirtieth or thirty-first day. Specifically in accordance with the invention this is effected by providing a number of teeth corresponding to the number of days and actuating the wheel one tooth for each day. The last three teeth are progressively offset and the drive pinion is wide enough to engage with the farthest offset tooth, but is axially slidable so as to allow it to escape one or more of the offset teeth.

Means controlled by the yearly calendar actuating means are provided to regulate the extent of axial movement of the pinion on leap years so as to hold it in position to engage the twenty-ninth tooth and escape the thirtieth tooth. Specifically this is under the control of an edge cam that rotates with the monthly calendar device and has four properly spaced shallow depressions in it for the thirty-day months and one deep depression for February; and an operating lever controlled by it shifts the axial position of the pinion. On leap years the yearly calendar operating means presents a stop in the way of the pinion and limits its movement to an escape from the twenty-ninth tooth.

Other features and advantages of the invention will appear from the following particular description of the illustrated embodiment of the invention.

Figure 1:
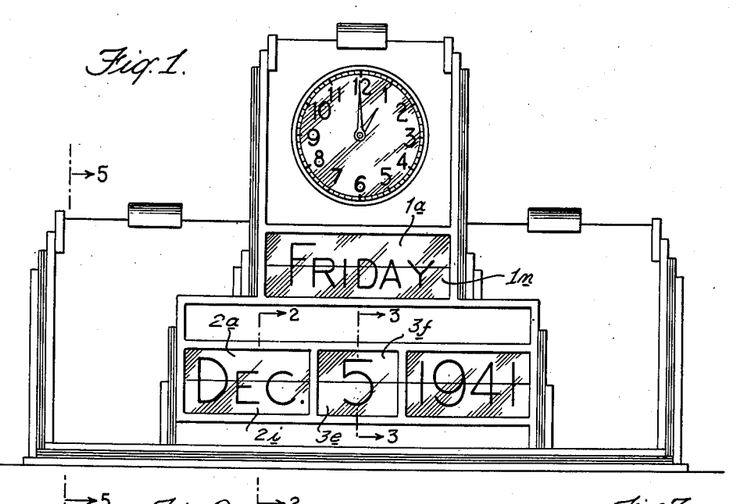
Fig. 1 is a front elevation of a clock and calendar mechanism embodying the invention.

The combined clock and calendar mechanism as shown in Fig. 1, has a clock dial and works surmounting the calendar displays. The day-of-the-week unit is immediately underneath the clock dial, and below it in horizontal line are the month, day and year units.

Figure 2:
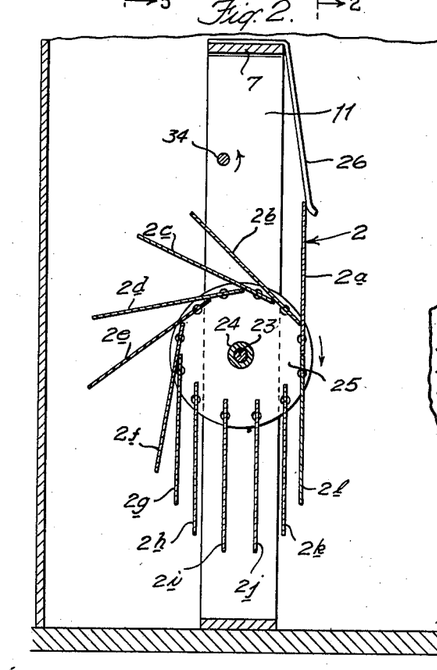
Fig. 2 is a transverse sectional elevation on enlarged scale of the lower portion of the same on line 2—2 of Fig. 1.
Figure 3:
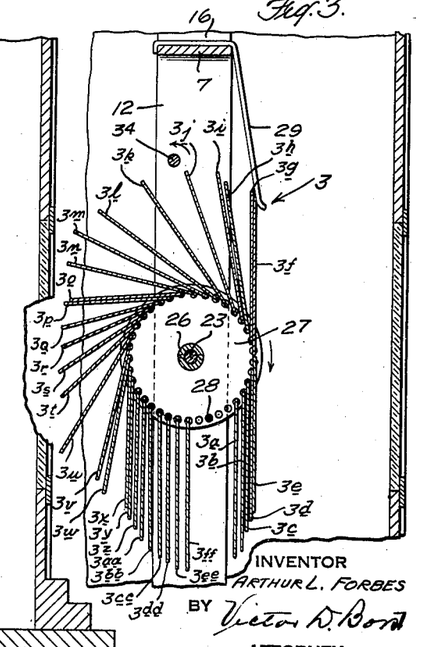
Fig. 3 is a similar sectional elevation on line 3—3 of Fig. 1.

The day-of-the-week unit is designated generally by the numeral 1, the monthly unit by the numeral 2, the numerical daily unit by the numeral 3, and the yearly unit by the numeral 4. The calendar mechanism is contained within a frame such as is shown complete in Fig. 4 and elements of which will be hereinafter referred to. Legs 5 support the clock works on top of the frame and a vertical shaft 6 which is coupled to drive the calendar mechanism is driven by the clock works at a proper speed, for example, one complete rotation every hour. The case provides glass windows in front of each of the calendar units, as shown particularly in Figs. 1, 2 and 3.

Figure 4:
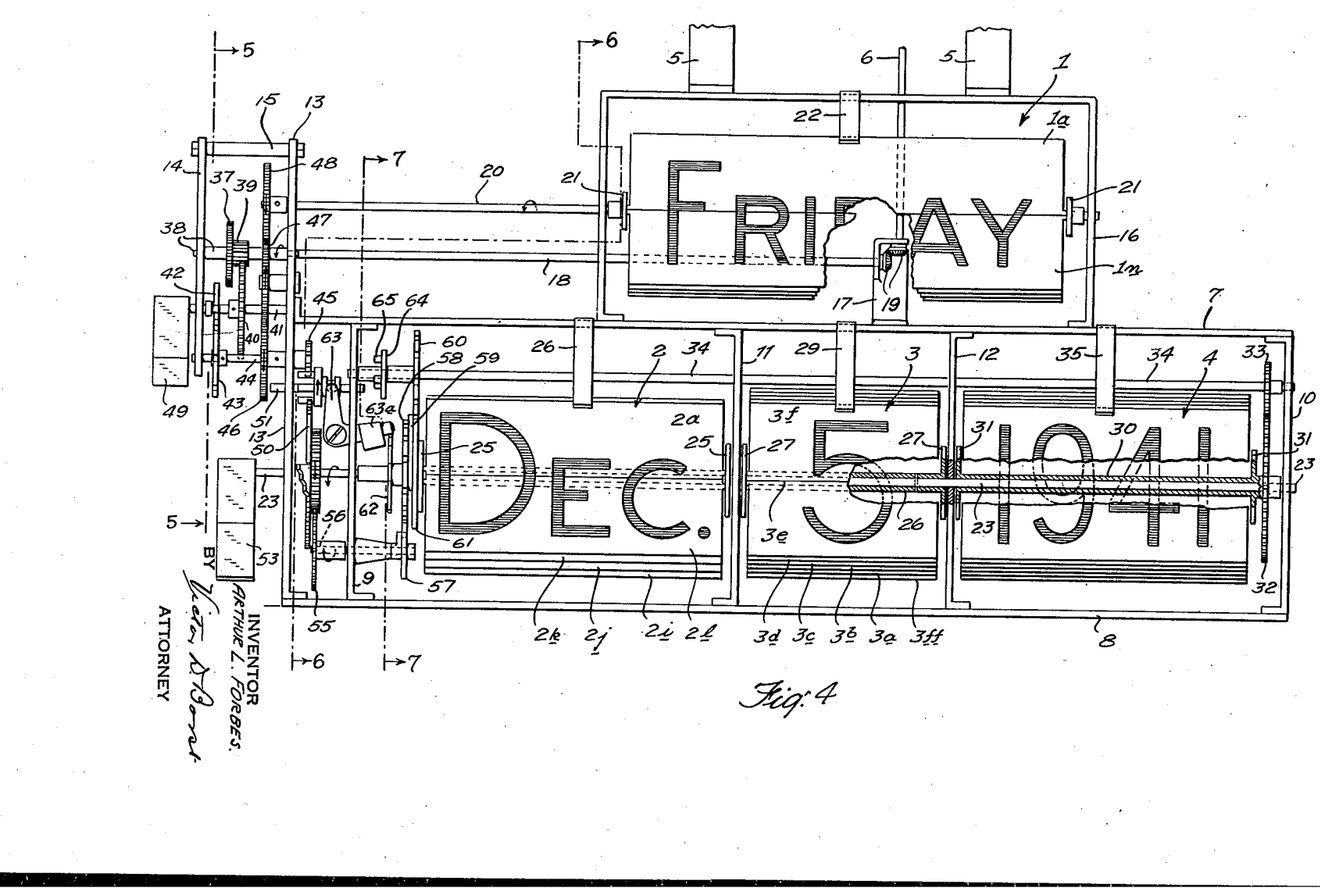
Fig. 4 is a front elevation of the calendar mechanism with the casing removed and parts broken away.

The frame is a skeleton member composed of three main sections, a bottom section which is a rectangle long enough to include the calendar units 2, 3 and 4 and at one end the driving parts peculiar thereto, a shorter rectangular section on top thereof for the unit 1, and at one end what may be termed the works section containing the drive elements immediately driven by the clock and distributing the drive to the upper and lower sections.

The bottom section is composed of top and bottom strips 7 and 8, end strips 9 and 10 and two intermediate vertical strips 11 and 12 defining the space for the unit 3. The end strip 9 is set in somewhat from the ends of the top and bottom strips 7 and 8, and a vertical strip 13 closes this end and extends well above the top of this lower section. The space between the vertical strips 9 and 13 houses drive elements for the lower calendar units, as will later be described.

Figure 5:
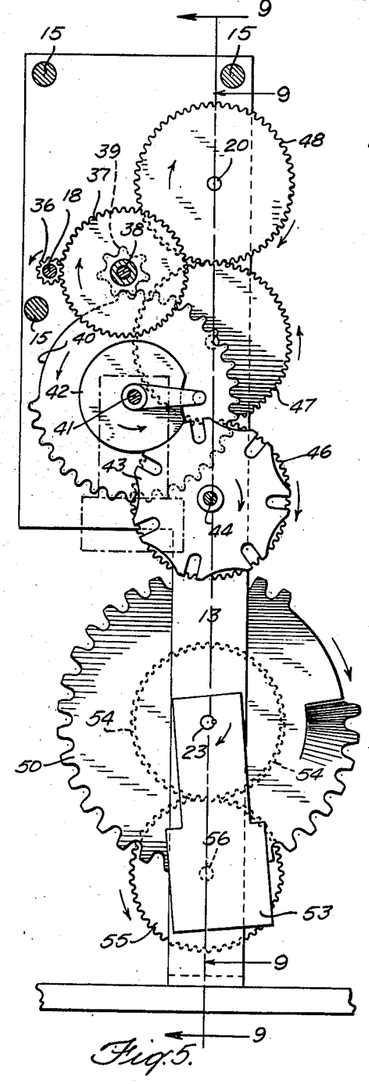
Fig. 5 is an enlarged transverse sectional elevation on line 5—5 of Figs. 1, 4 and 9.

The outside end strip 13 is extended laterally throughout substantially its upper half to form a plate portion, as shown in Fig. 5, and spaced outwardly therefrom and opposing it is a similar plate member 14, attached and spaced by pins 15. Between these plates is housed the master gearing, as will later appear.

The upper or top section of the frame for unit 1 consists of a rectangular strip 16 secured on top of the strip 7. Also from the top of the strip 7 extends an attached, rearwardly extending, angular bracket strip 17 the top end of which provides a bearing for the vertical clock driven shaft 6 and for the horizontal drive shaft 18 operatively connected to the shaft 6 by bevel gears 19.

As hereinbefore stated each of the calendar units consists of a plurality of card members hung loosely in spool-like rotative supports, two cards combining to form a complete display. In the construction shown two discs are fixed in spaced relation on a shaft and are provided with a selected number of circumferentially arranged holes, and the cards span the discs and are provided at one edge with lateral extensions of a size to enter the holes and swing loosely therein. The holes should be close enough together that two cards when combining to make a display will not have an appreciable space between their adjacent edges.

Figure 6:
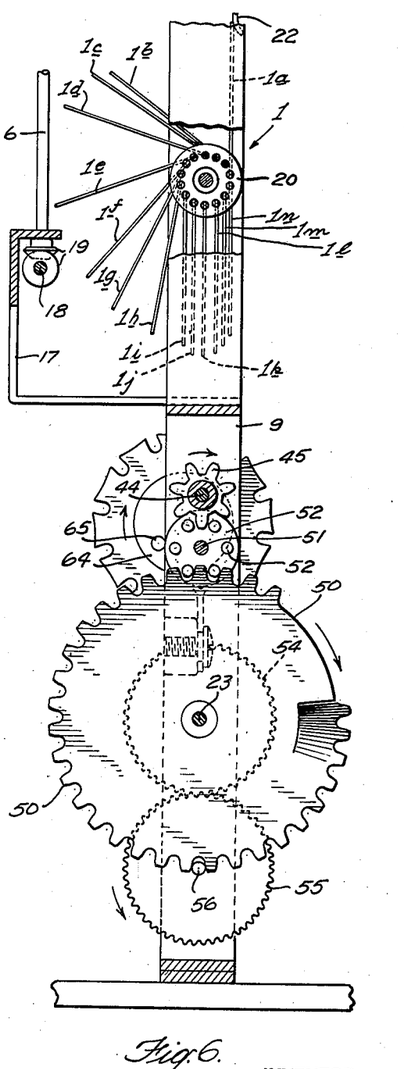
Fig. 6 is a similar sectional elevation on the broken line 6—6 of Figs. 4 and 9.

The day-of-the-week unit 1 is fixed on a horizontal shaft 20 that bears in the plate portion of strip 13 and in the two ends of frame member 16. Just inside of these ends the shaft 20 is provided with opposing discs 21 having hub portions secured to the shaft. These discs are provided with fourteen equally spaced holes, as shown in Fig. 6, and in each opposing pair of holes is hung a card of a size to form half of a display. The number of cards is of course twice that of the days of a week and it is obvious that half as many cards would serve the purpose so far as forming successively in front display seven week-day names with which each complete rotation of the discs is concerned. However it has been found that with a number as small as seven the operation is improved by doubling the number of cards and having every alternate face a blank. Thus in shifting from one display position to the next there is an intermediate display of two blank faces. The holders of course have to be turned one-seventh of a complete rotation with each actuation, which means that it rotates the distance of two holes instead of one.

Figure 8A:
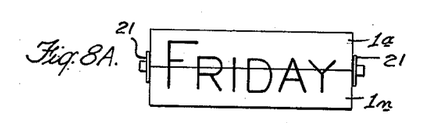
Figs. 8A to 8N, inclusive, are diagrammatic views of the day-of-the-week calendar cards showing them in their successive positions.
Figure 8B:
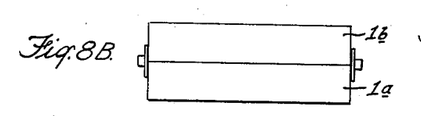
Figure 8C:
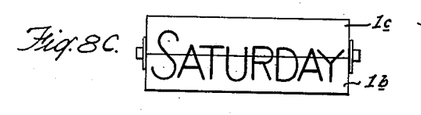
Figure 8D:
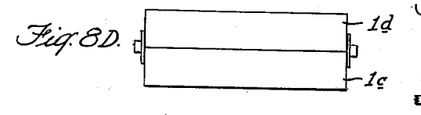
Figure 8E:
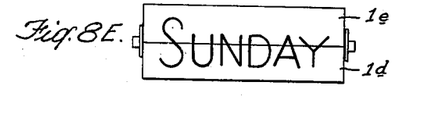
Figure 8F:
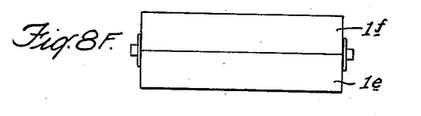
Figure 8G:
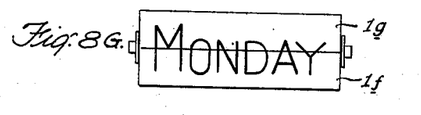
Figure 8H:
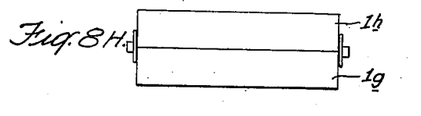
Figure 8I:
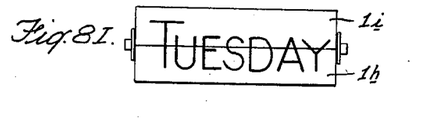
Figure 8J:
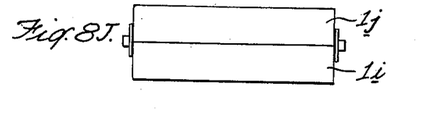
Figure 8K:
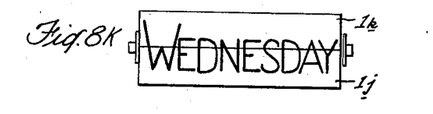
Figure 8L:
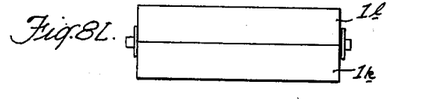
Figure 8M:
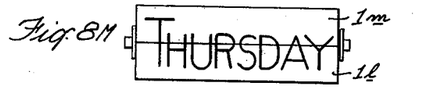
Figure 8N:
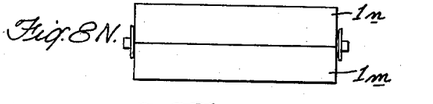

The cards are numbered 1a to 1n, inclusive, and their successive relative positions are illustrated in Figs. 8A to 8N, inclusive. Beginning with the position shown in Fig. 1, in which "Friday" is displayed, the upper card is 1a and the lower card is 1n. A finger 22 depends from the top of the frame in position to catch the top edge of card 1a and all successive cards as they come around, the cards successively clearing the finger as the holder rotates.

With fourteen cards one face of each card is blank and one face contains half of a display. The arrangement is alternated on successive cards so as to bring successively two blank faces together and then two inscribed faces. As explained the unit passes right through the blank display in changing from one day to the next. Figs. 8A to 8N, inclusive, illustrate the sequence, it being understood that the ratio of the drive which will later be described is such as to move from position 8A to 8C, then from 8C to 8E, and so on.

The three units 2, 3 and 4 are all arranged coaxially on one shaft 23 which in the form shown is continuous from one end of the lower frame section to the other and bears in all of the vertical strips 13, 9, 11, 12 and 10.

The holder for the monthly cards of unit 2 consists of a sleeve 24 loose on the shaft 23, and an attached disc 25 on each end. The discs are provided with twelve holes and the twelve monthly cards hung therein are designated 2a to 2l, inclusive. A finger 26 depending from the frame strip 7 catches the top edge of the upright card as previously described. In this case, since the number of the cards corresponds with the number of displays for each complete rotation of the unit, both faces of the cards are inscribed. Thus since the exposed faces of cards 2a and 2l display the insignium "Dec." it is clear that the back face of card 2a must bear the lower half of the word or abbreviation used for January, and the front face of card 2b in its upright position will form the other half of that word or abbreviation, and so on. It is obvious that each actuation of this unit must turn it one twelfth of a complete rotation.

The holder for the day-of-the-month cards of unit 3 is sleeve 26 fixed on the shaft 23 between the upright strips 11 and 12, and two discs 27 on the ends of the sleeve. There are a maximum of thirty-one days in a month and hence there must be a minimum of thirty-one cards with inscription on both faces. However in this case there is some necessary idle space to provide for the sudden partial rotation of the shaft accompanying the change of the month display, as above mentioned and as will be later described in detail. Actually this idle rotation is approximately 50° and the discs 27 are therefore provided with 36 holes, the actuation for each day being substantially 10°.

Beginning with the first card to be exposed after the idle movement the cards are designated 3a to 3ff, inclusive. These two cards are blank on their adjacent faces. Therefore the bottom of the numeral 1 is on the present right-hand face of card 3a and the top is on the present left-hand face of card 3b, the adjacent faces of the next two cards form the symbol "2," and so on around to "31" which is formed by the two adjacent faces of cards 3ee and 3ff. A stretcher rod 28 joins the discs 27, its ends fitting in a pair of holes in the idle space, and supports or backs up the last card 3ff for correct display position. A finger 29, similar to fingers 22 and 26, supports the top card of a display upright.

The cards of the yearly calendar unit 4 are similarly carried on a holder within the space between the intermediate strip 12 and the end strip 10. The holder consists of a sleeve 30 freely bearing on the shaft 23, and discs 31 on the ends of the sleeve. Means for driving the holder include gear 32 on the outer end of the sleeve which meshes with pinion 33 on shaft 34 above shaft 23 and parallel thereto, and bearing in the vertical strips 9, 11, 12 and 10. Since the unit 4 is continuous and not repetitive, as many cards as are desired and as are feasible may be used in this holder. Obviously when enough years have passed to use up all the cards, this unit will have to be reloaded. A finger 35 similar to finger 29 holds up the top card of each display.

The works in the frame section at the left end of the frame between the plates 13 and 14, referred to above as the master gearing, is driven constantly by the clock and effects an intermittent actuation every twenty-four hours which through a branching connection is delivered directly to the two daily calendar units 1 and 3, and intermittently to the monthly and yearly units 2 and 4.

The shaft 18 has on its outer end a pinion 36 meshing with the large gear 37 of an intermediate double gear on arbor 38, the small pinion gear 39 of which is in meshing relation with a mutilated gear wheel 40 on arbor 41. Fixed on the arbor 41 is the single tooth element 42 of a Geneva lock, the star or slotted element 43 of which is fixed on arbor 44. The right end of the arbor 44 extends through the plate 13 and has fixed on it a pinion 45 for driving the three lower calendar units through means described hereinafter. The angular movement of arbor 44 is transmitted in a one-to-one ratio to shaft 20 through gears 46, 47 and 48.

The gear ratio is such that the mutilated gear 40 is turned throughout the extent of its toothed portion in a period of twenty-four hours. For example the pinion 36 may have ten teeth, the gear 37 sixty teeth, the pinion 39 seven teeth and the mutilated gear 40 twenty-eight teeth. Then a turning of the shaft 18 at the rate of one turn an hour will turn the gear 40 twenty-eight teeth in twenty-four hours.

Figure 9:
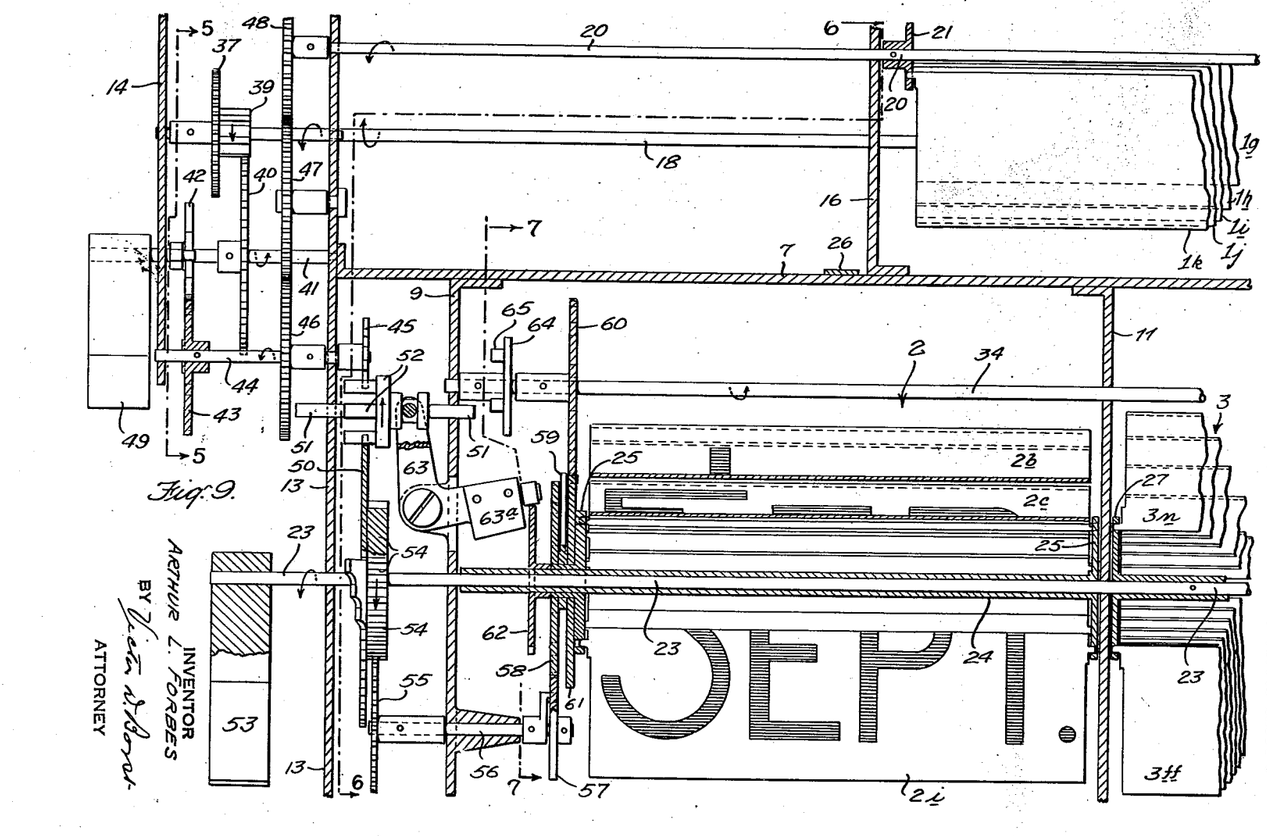
Fig. 9 is a partial longitudinal sectional elevation on line 9—9 of Fig. 5.

The arbor 41 has fixed on its outer end outside the plate 14 an eccentric weight 49 (Figs. 4 and 9), hung so that it will be over center in an upper quadrant when the pinion 39 rides off onto the smooth portion of the periphery of the mutilated gear. The weight then drops and turns the gear 40 until the first tooth strikes the pinion tooth, and it is so angularly disposed that it continues to exert a turning force upon the gear until the pinion effects a driving mesh with the gear tooth. Thereafter the pinion again drives the gear throughout its toothed portion and the operation described recurs every twenty-four hours.

The single tooth on the Geneva stop member 42 is positioned to engage in a slot of its cooperative member and impart an actuation to the arbor 44 each time that the weight drops. This is once a day, just at midnight, and the star wheel is provided with seven slots. Therefore in seven days the arbor 44 and hence the shaft 20 will be given seven impulses or one complete rotation. Since the intermittent impulses to the arbor 44 are completely effected in one quick movement, there is no delay in shifting the daily display in the calendar unit 1. Each impulse of the shaft 20 and of the unit 1 is one-seventh of a rotation or the distance of two holes in the discs 21.

The numerical daily display of the unit 3 is likewise effected by the Geneva stop, for the pinion 45 drives the shaft 23, as will now be described. Fixed on the shaft 23 immediately below the pinion 45 is another mutilated gear 50. This is the gear for actuating the monthly calendar, as will later appear, and it has thirty-one teeth. Between the pinion 45 and the gear wheel 50 is an axially slidable spindle 51 fixed on which is a pinion 52 meshing with the pinion 45 and in meshing relation with the gear wheel 50. Therefore every time that the pinion 45 gets an impulse, that impulse is transmitted to the shaft 23 through the pinion 52 and gear wheel 50. In this way the upstanding card of unit 3 is quickly dropped, the shaft 23 being turned one thirty-sixth of a rotation, as above described.

The shaft 23 is provided on its outer end with a weight 53, positioned like the weight 49, to pick up as the pinion rides off onto the smooth portion of the periphery and complete the rotation of the gear wheel and shaft. The gear wheel 50 has on its hub a gear 54 that meshes with a gear 55 of the same size and secured on spindle 56 bearing in the strip 9 near its lower end. This spindle drives the intermittent gear for actuating the monthly calendar.

Figure 7:
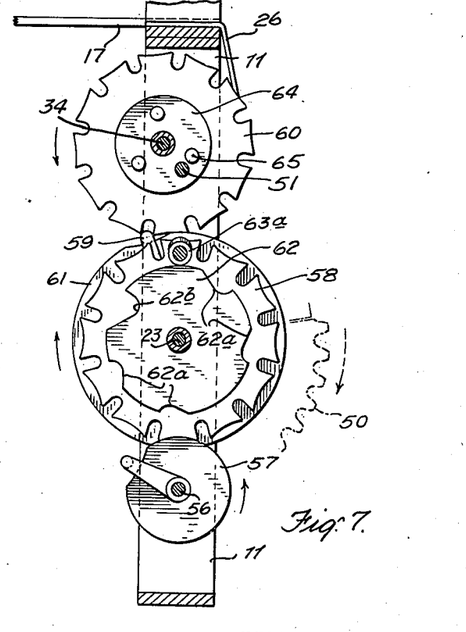
Fig. 7 is a transverse sectional elevation of the lower portion of the calendar mechanism on the line 7—7 of Figs. 4 and 9.

This intermittent gear is also shown as a Geneva lock, the single tooth element 57 of which is fixed on the spindle 56, and the slotted element 58 of which has twelve slots (Fig. 7) and is fixed on the hub of the adjacent disc 25 of the card-holder for the unit 2. Therefore one complete rotation of the gear wheel 50 causes one actuation of the monthly unit, and the parts are so related that the impulse occurs as the weight drops. In this way the monthly calendar change is also quickly and positively effected.

The monthly unit also controls the yearly unit. The twelfth monthly change effects a change in the yearly display. This is done through another intermittent gear of the Geneva stop type, consisting of a single tooth element 59 fixed on the hub of the disc 25, and a slotted element 60 on the shaft 34 having any selected number of slots. A locking disc 61 on the hub of disc 25 coacts to lock the driven element 60 in adjusted position. It is apparent that since the shaft 34 is thereby intermittently actuated by the monthly calendar unit, it too is quickly moved as the weight 53 drops and rotates the gear wheel 50 through the angle of the smooth peripheral portion. Thus the dropping of the year card each time is sure.

The feature whereby the mechanism is caused to compensate for different lengths of months will now be described. As above stated, the pinion 52 and the spindle 51 on which it is fixed are axially slidable. The last three teeth of the mutilated gear driven by the spindle are progressively offset, as shown clearly in Figs. 4 and 9, and the pinion is made wide enough to engage with the farthest offset tooth when the pinion is in its farthest adjusted position toward the left as shown in these figures of the drawings, while movement to the right will cause it to miss one or more of the last three teeth according to the axial position. To control this axial position cam means are employed.

An edge cam 62 fixed on the hub of disc 25 at the left of the intermittent gear element 58 has four shallow depressions 62a spaced so that with a proper setting of the cam a cam follower will enter those depressions on the occurrence of the four thirty-day months. The edge of the cam is also provided with a deep depression 62b positioned so that the cam follower will enter it when February occurs. A pivoted bell-crank lever 63 has one arm weighted or otherwise biased to cause a roller 63a on the end of the arm to follow the contour of the cam. The other end of the bell-crank lever has a yoke and pin engagement with a circumferential groove in the hub of the pinion 52.

By means of this cam and lever arrangement the axial position of the pinion 52 will be determined according to the month. If the cam roller is in a shallow groove the pinion will miss the thirty-first tooth of the multilated gear 50 but will engage the thirtieth tooth. If the roller is in the bottom of the deep depression the pinion will miss all of the three offset teeth, as a consequence of which the weight takes charge when the pinion leaves the thirty-eighth tooth.

To take care of leap years the shaft 34 is provided with a stop or abutment member that comes around every four years in position to limit the adjustment of the pinion 52 when the cam roller opposes the deep depression 62b. This is best shown in Figs. 10 to 13, inclusive. The shaft 34 has on it near its left end a disc 64 which is provided on its face toward the pinion 52 with a plurality of circumferentially arranged pins 65 adapted to cross the axis of the spindle 51. As the spindle slides out with the pinion 52 it passes the plane of the outer ends of the pins 65 when the roller 62a is at the bottom of cam depression 62b. The pins 65 are so located that they come into position to act as a stop for the spindle every fourth February.

Figures 10, 11:
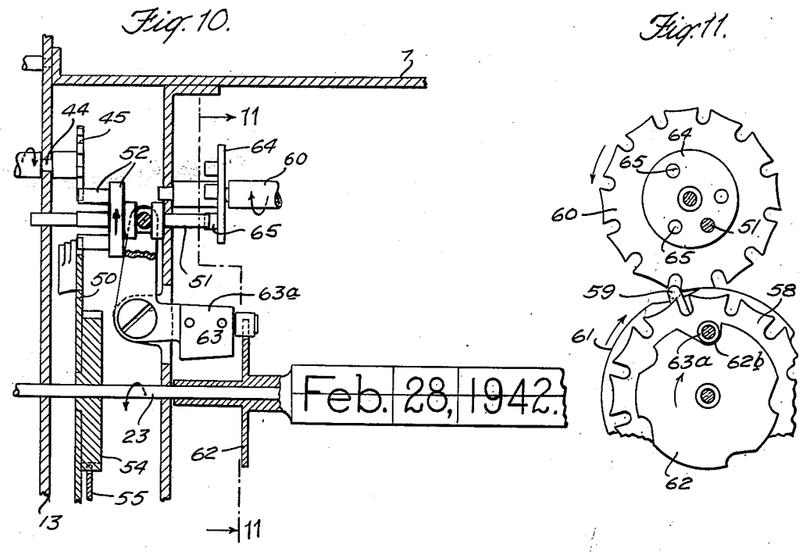
Fig. 10 is a detail in longitudinal sectional elevation of that part of the monthly calendar shifting mechanism which controls the day of the month on which the shifting is done, with a diagrammatic representation of the date represented by the particular position of the parts.
Fig. 11 is a transverse sectional elevation on line 11—11 of Fig. 10.
Figure 12:
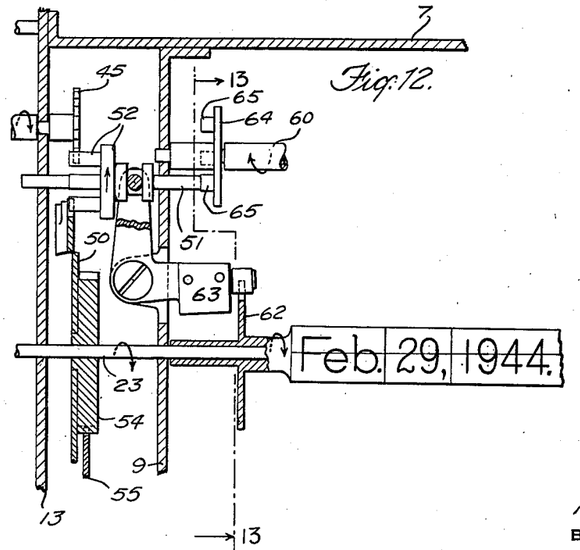
Fig. 12 is a view similar to Fig. 10 but showing the parts in their position on the 29th day of February of a leap year.
Figure 13:
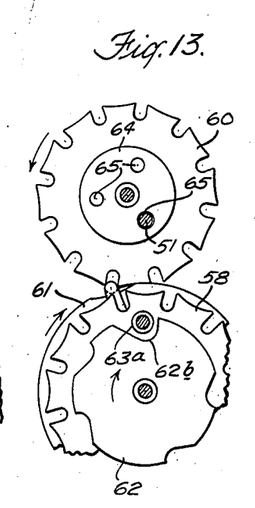
Fig. 13 is a transverse sectional elevation on line 13—13 of Fig. 12.

Figures 10 and 11 show the relation of these parts on a non-leap year, and Figs. 12 and 13 show their relation on a leap year. When the spindle strikes a pin, as shown in the last two figures, the roller 63a is prevented from dropping fully into the depression 62b and is held where the pinion 52 will engage the twenty-ninth tooth of gear wheel 50 before escaping from the teeth and allowing the weight to rotate the gear wheel and effect the quick transfer.

It will be apparent that the number of pins 65 is determined by the number of slots in the member 60. There must be one-fourth as many pins as there are slots.

It is obvious that various modifications may be made in the construction shown in the drawings and above particularly described within the principle and scope of the invention.

I claim:

1. A perpetual calendar comprising a rotative device adapted progressively to display calendar insignia, an intermittent gear connected to actuate the rotative device, a multilated gear, a driven pinion meshing with and driving the mutilated gear, an energy storing device operated by the mutilated gear and connected to rotate the mutilated gear suddenly through the angle during which the driven pinion opposes the smooth portion of the periphery, and means operatively connecting the mutilated gear to the intermittent gear to actuate the same during the said sudden movement.

2. A perpetual calendar comprising a rotative device adapted progressively to display calendar insignia, a Geneva stop connected to actuate the rotative device, a mutilated gear, a driven pinion meshing with and driving the mutilated gear, the mutilated gear being connected to actuate the Geneva stop during that part of each rotation when the driven pinion opposes the smooth portion of its periphery, and means to drive the mutilated gear at an accelerated rate during said part of each rotation.

3. A perpetual calendar comprising a rotative device adapted progressively to display calendar insignia, a Geneva stop connected to actuate the rotative device, a mutilated gear operatively connected to the single tooth element of the Geneva stop, a driven pinion meshing with the mutilated gear and geared to drive the same throughout the extent of its toothed portion in a predetermined time, and auxiliary means to actuate the gear through the angular movement when the driven pinion opposes the smooth portion of its periphery, the Geneva stop elements being set so that they advance one step at each actuation of the auxiliary means.

4. A perpetual calendar comprising a rotative device adapted progressively to display calendar insignia, a Geneva stop connected to actuate the rotative device, a mutilated gear operatively connected to the single tooth element of the Geneva stop, a driven pinion meshing with the mutilated gear and geared to drive the same throughout the extent of its toothed portion in a predetermined time, and a weight eccentrically fixed to the gear to rotate therewith and positioned to impart rotation to the gear through the part of each rotation when the drive pinion opposes the smooth part of its periphery, the Geneva stop elements being so set that they advance one step during the movement of the gear under the influence of the weight.

5. A perpetual calendar comprising a rotative device adapted progressively to display the days of the week, a second rotative device adapted progressively to display days of the month, a drive shaft for each device, an intermittent gear operatively connected to actuate both shafts, a mutilated gear operatively connected to the intermittent gear to actuate the same once for each rotation of the mutilated gear, a driven pinion meshing with the mutilated gear and geared to drive the same throughout the extent of its toothed portion once in every twenty-four hours, and quick impulse means to actuate the mutilated gear rapidly through its angular movement when the drive pinion opposes the smooth portion of its periphery, the intermittent gear being so set as to actuate the two shafts simultaneously during the rapid movement of the mutilated gear by the quick impulse means.

6. A perpetual calendar comprising a shaft, a daily calendar device rotatively connected to the shaft and adapted by rotation progressively to display days of the month, a sleeve rotatively mounted on the shaft, a monthly calendar device carried by the sleeve and adapted by rotation progressively to display names of the months, a mutilated gear operatively related to the shaft, an intermittent gear driven by the mutilated gear and connected to drive the sleeve, a driven pinion meshing with the mutilated gear and driving the same throughout the extent of its engagement with the toothed portion thereof, and quick impulse means to actuate the mutilated gear rapidly through its angular movement when the pinion opposes the smooth portion of its periphery.

7. A perpetual calendar comprising a shaft, a daily calendar device rotatively connected to the shaft and adapted by rotation progressively to display days of the month, a sleeve rotatively mounted on the shaft, a monthly calendar device carried by the sleeve and adapted by rotation progressively to display names of the months, a mutilated gear operatively related to the shaft, an intermittent gear driven by the mutilated gear and connected to drive the sleeve, a pinion meshing with the mutilated gear and driving the same throughout the extent of its engagement with the toothed portion thereof, quick impulse means to actuate the mutilated gear rapidly through its angular movement when the pinion opposes the smooth portion of its periphery, a second intermittent gear connected to drive the pinion, and driving means connected to actuate the said second intermittent gear once each twenty-four hours.

8. A perpetual calendar comprising a rotative device adapted progressively to display names of the months, and means to rotate the device intermittently and progressively including a gear wheel having thirty-one teeth representing thirty-one days of a month, an intermittent gear connected to actuate the device, a drive connection between the gear wheel and the intermittent gear, a pinion movable into and out of operative engagement with the gear wheel for driving the gear wheel, and control means actuated by the gear wheel for moving the pinion into and out of operative engagement with the gear wheel at selected positions of the device.

9. A perpetual calendar comprising a rotative device adapted progressively to display names of the months, and means to rotate the device intermittently and progressively including a gear wheel having thirty-one teeth representing thirty-one days of a month, an intermittent gear connected to actuate the device, a drive connection between the gear wheel and the intermittent gear, a pinion movable into and out of operative engagement with the gear wheel for driving the gear wheel, a rotative cam actuated by the intermittent gear, and means controlled by the cam for moving the pinion into and out of operative engagement with the gear wheel at selected positions of the device.

10. A perpetual calendar comprising a rotative device adapted progressively to display names of the months, and means to rotate the device intermittently and progressively including a mutilated gear wheel having thirty-one teeth and a smooth peripheral portion between the first and last teeth, the last three teeth being progressively offset an increasing amount from the plane of the gear wheel, means including an intermittent gear forming a drive connection between the gear wheel and the device, an axially slidable pinion engageable with the teeth of the gear wheel, means for driving the pinion, auxiliary means to complete the rotation of the gear wheel when the pinion opposes the smooth portion of the periphery, a cam actuated by the intermittent gear, and means controlled by the cam for determining the axial position of the pinion and thus determine at which of the last three teeth the pinion loses control and the auxiliary means takes control of the gear wheel.

11. A perpetual calendar comprising a rotative device adapted progressively to display names of the months, and means to rotate the device intermittently and progressively including a mutilated gear wheel having thirty-one teeth and a smooth peripheral portion between the first and last teeth, the last three teeth being progressively offset an increasing amount from the plane of the gear wheel, means including an intermittent gear forming a drive connection between the gear wheel and the device, an axially slidable pinion engageable with the teeth of the gear wheel, means for driving the pinion, auxiliary means to complete the rotation of the gear wheel when the pinion opposes the smooth portion of the periphery, an edge cam rotatable with the device and having shallow cam depressions angularly spaced to represent the thirty-day months and a deep depression angularly positioned to represent February, and a bell crank lever one end of which is operatively connected to the pinion to slide it on its axis, and the other end of which has a cam follower caused to follow the contour of the cam.

12. A perpetual calendar comprising a rotative monthly calendar device adapted progressively to display names of the months, a rotative yearly calendar device adapted progressively to display year dates, a gear wheel having thirty-one teeth representing thirty-one days of a month, drive means including an intermittent gear adapted to actuate the monthly calendar device one step for each rotation of the gear wheel, an adjustable driven pinion engageable with the teeth of the gear wheel, cam means actuated with the monthly calendar device, a control member operated by the cam means to adjust the pinion to one position relates to the gear wheel when a thirty-day month is displayed and to adjust the pinion farther when February is displayed, a shaft for operating the yearly calendar device, intermittent actuating means for the shaft driven by the monthly calendar device, and an abutment member movable by the shaft and positioned every fourth display of February to limit the adjustment of the pinion.

13. A perpetual calendar comprising a rotative monthly calendar device adapted progressively to display names of the months, a rotative yearly calendar device adapted progressively to display year dates, a mutilated gear wheel having thirty-one teeth and a smooth peripheral portion between the first and last teeth, the last three teeth being progressively offset an increasing amount from the plane of the gear wheel, means driven by the gear wheel for intermittently actuating the monthly calendar device, an axially slidable pinion engageable with the teeth of the gear wheel, means for driving the pinion, auxiliary means to complete the rotation of the gear wheel when the pinion opposes the smooth portion of the periphery, a cam actuated with the monthly calendar device, a control member for the pinion operated by the cam to slide the pinion out of the path of the last tooth of the gear wheel when a thirty-day month is displayed and to move the pinion to an extreme position out of the path of the last three teeth when February is displayed, a shaft for operating the yearly calendar device, intermittent actuating means for the shaft driven by the monthly calendar device, and a rotative abutment member carried by the shaft in position to oppose the pinion every fourth February and limit its axial movement to escape engagement with the thirtieth tooth and cause it to engage the twenty-ninth tooth.

14. A perpetual calendar comprising a rotative monthly calendar device adapted progressively to display names of the months, a rotative yearly calendar device adapted progressively to display year dates, a mutilated gear wheel having thirty-one teeth and a smooth peripheral portion between the first and last teeth, the last three teeth being progressively offset an increasing amount from the plane of the gear wheel, means driven by the gear wheel for intermittently actuating the monthly calendar device, an axially slidable pinion engageable with the teeth of the gear wheel, means for driving the pinion, auxiliary means to complete the rotation of the gear wheel when the pinion opposes the smooth portion of the periphery, an edge cam actuated with the monthly calendar device and having shallow cam depressions angularly spaced to represent the thirty-day months and a deep depression to represent February, a bell crank lever one end of which is operatively connected to the pinion to slide it on its axis and the other end of which has a cam follower caused to follow the contour of the cam, the parts being proportioned so that when the cam follower is in one of the shallow depressions the pinion escapes the thirty-first tooth and engages the thirtieth tooth and when the cam follower is in the deep depression the pinion escapes the last three teeth and engages the twenty-eighth tooth, a shaft for operating the yearly calendar device, intermittent actuating means for the shaft driven by the monthly calendar device, and a rotative abutment member carried by the shaft in position to oppose the pinion every fourth February and limit its axial movement to escape engagement with the thirtieth tooth and cause it to engage the twenty-ninth tooth.

ARTHUR L. FORBES.